United States Patent [19]
Sorkin

[11] Patent Number: 6,012,867
[45] Date of Patent: Jan. 11, 2000

[54] MULTI-STRAND ANCHORAGE SYSTEM WITH AN ANCHOR BODY FOR RECEIVING A GROUT TUBE

[76] Inventor: Felix L. Sorkin, 4115B Greenbriar Dr., Stafford, Tex. 77477

[21] Appl. No.: 08/912,604

[22] Filed: Aug. 18, 1997

[51] Int. Cl.⁷ .................................................. E21D 20/02
[52] U.S. Cl. ...................... 403/288; 403/268; 52/223.13; 52/704; 285/921
[58] Field of Search ................................ 52/223.13, 704; 403/265, 269, 288; 285/921, 210, 314

[56] References Cited

U.S. PATENT DOCUMENTS

| | | | |
|---|---|---|---|
| 3,243,206 | 3/1966 | Samer | 285/921 X |
| 3,809,412 | 5/1974 | Glover | 285/921 X |
| 4,018,459 | 4/1977 | Mominee et al. | 285/921 X |
| 4,128,264 | 12/1978 | Oldford | 285/921 X |
| 4,449,855 | 5/1984 | Langwadt | 52/223.13 X |
| 4,462,620 | 7/1984 | Bambenek et al. | 285/921 X |
| 4,484,425 | 11/1984 | Muller | 52/223.13 |
| 4,494,779 | 1/1985 | Neff et al. | 285/921 X |
| 4,787,655 | 11/1988 | Gross et al. | 285/921 X |
| 4,803,053 | 2/1989 | Williamson | 285/921 X |
| 5,031,941 | 7/1991 | Bartholomew | 285/921 X |
| 5,345,742 | 9/1994 | Rogowsky et al. | 52/223.13 X |

FOREIGN PATENT DOCUMENTS

| | | | |
|---|---|---|---|
| 0666072 | 7/1963 | Canada | 285/921 |

Primary Examiner—Lynne H. Browne
Assistant Examiner—John R. Cottingham
Attorney, Agent, or Firm—Harrison & Egbert

[57] ABSTRACT

A multi-strand anchorage system having an anchor body with a tendon-receiving area therein and a channel extending through a wall thereof, and a grout tube extending through the channel so as to have an outlet opening to the tendon-receiving area. The channel opens at an exterior of the anchor body and communicates with the tendon-receiving area. The grout tube has a pronged exterior surface adjacent the outlet of the grout tube. The pronged exterior surface is in abutment with a surface of the anchor body. The grout tube serves to pass grout to the tendon-receiving area. The grout tube has a shoulder formed a distance from the outlet and having a diameter less than the diameter of the channel. An elastomeric annular seal is affixed around the grout tube so as to be in abutment with a shoulder of the grout tube and in compressive abutment with a shoulder in the channel.

15 Claims, 3 Drawing Sheets to triple the cost of the anchor body itself. As such, a need has developed in which to provide a grout hole on such multi-strand post-tensioning systems which is less expensive and easier to use.

MULTI-STRAND ANCHORAGE SYSTEM WITH AN ANCHOR BODY FOR RECEIVING A GROUT TUBE

TECHNICAL FIELD

The present invention relates to methods and apparatus for installing multi-strand post-tension systems. More particularly, the present invention relates to anchorages as used in such multi-strand systems. Furthermore, the present invention relates to methods for transmitting grout into the interior of anchors and ducts used in such multi-strand post-tension systems.

BACKGROUND ART

Multi-strand post-tensioning systems are used in a wide variety of applications. Conventionally, such systems are used for all types of slabs in buildings, bridge decks, and similar applications. Typically, a plurality of strands are placed so as to extend through ducts. The ends of the strands which extend outwardly of the ducts are placed into anchorages. The strands are stressed and locked-off individually. The post-tensioning of such systems enables slab deflections and cracks under severe service conditions to be kept under control. This permits larger spans and thicker slabs to be used. The reduced materials and labor results in lower costs and faster construction. Additionally, there can be indirect savings on foundations, columns, walls and vertical surfaces.

In normal use in such existing multi-strand post-tensioning systems, the ends of the strand will extend through separate holes formed in an anchorage body. Typically, a plastic trumpet will interconnect the anchorage body to the flat tendon-containing duct. The strands will extend through tapered holes formed in the anchorage body. Normally, the strands will be angularly offset from one another as they extend through the anchorage body.

After installation, wedges are placed around the exterior of each of the outwardly extending strands. A jack is used so as to stress the strands. The wedges will remain in contact with the strands during the stressing operation. After the jack has sufficiently stressed the strands, the pressure in the jack is released so that the wedges automatically seat in the conical holes of the anchor head.

After the strands are wedged into the holes of the anchor, it is then necessary to grout the interior of the anchor and the interior of the duct. In order to facilitate the grouting of such duct, a grout hole is machined into the body of the anchor. Under existing systems, a hole is drilled and tapped through the body of the anchor so as to communicate with the interior of the duct. After the hole is machined and tapped, a special fitting is installed so as to connect a grout tube with this hole. The grout tube is then free to pass grout into the interior of the duct so that grout can be used to fill the interior of the duct and to solidify on the interior of the duct. Normally, the drilled and tapped hole in the anchorage body extends transverse to the tendon-receiving passageways so as to open on a top surface of the anchorage body. After the grout is pumped into the interior through this machined hole, the grout tube must be removed from the fitting and the hole should be sealed.

Unfortunately, the forming of such a grout hole makes the anchor very expensive. Under conventional circumstances, the anchor is made of a cast metal. The machining and forming of the grout hole on such anchorages is a time consuming and expensive operation. Often, the machining operations required so as to form the grout hole can double or triple the cost of the anchor body itself. As such, a need has developed in which to provide a grout hole on such multi-strand post-tensioning systems which is less expensive and easier to use.

FIGS. 1–3 illustrate a conventional prior art anchor as used in a multi-strand anchorage system. It can be seen in FIG. 1 that the anchor body 10 has a flanged back surface 12 which extends to an interior tendon-receiving passage 14. Grout hole 16 is formed through one of the gussets which extend from the tendon-receiving passage 14 to the flanged anchor body 12. As can be seen in FIG. 3, the grout hole 16 is drilled and tapped so as to receive the threaded fittings of a grout tube. FIG. 2 is a side view of the anchor body 10. In FIG. 2, it can be seen that the flanges 12 of the anchor body 10 extend outwardly from a central tubular area 18. The tendon-receiving area 14 is formed on the interior of the tubular area 18. FIG. 3 shows this prior art system as taken across lines 3—3 of FIG. 1. In particular, it can be seen that the grout hole 16 is formed in the surface 20 of the anchor body 10. The grout hole 16 includes a threaded area 22. The threaded area 22 is adjacent to the opening 24 on the surface 20 of the anchor body 10. The threaded area 22 includes female threads which are suitable for receiving the male threads of a fitting of a grout hole. Typically, the threaded area 22 is formed initially by drilling a hole into the surface 20 of the anchor body 10 and then tapping the hole. A curved passageway 26 will extend from the threaded area 22 so as to open at outlet 28. Outlet 28 serves to deliver grout to the tendon-receiving area 14 of the anchor body 10. The curved passageway 26 is typically formed in the casting of the anchor body 12.

As can be seen in FIGS. 1–3, the formation of the grout hole 16 is a rather complicated matter. Initially, steps must be taken so as to properly form the curved passageway 26 during the casting of the anchor body 10. After this curved passageway has been formed, then it is necessary to carry out machining operations so as to form the threaded area 22. These machining operations are quite complicated and time consuming. Finally, after the machining operations are completed, it will be necessary to threadedly affix a grout tube to the threaded portion 22 of the grout hole 16. In many circumstances, the threaded fitting on the grout tube will not properly align with the threads 22 on the grout hole 16 so as to create an improper connection between the grout tube and the anchor plate 10. This can cause the improper and leaking transmission of grout to the tendon-receiving area of the anchor plate 10.

In addition to the costs of forming the threaded area 22 on the anchor plate 10, there is an additional cost of forming a threaded fitting on the end of a grout tube. Normally, a metal threaded fitting is affixed to the elastomeric grout tube. The formation of the threaded fitting and the attachment of the threaded fitting to the grout tube is often a costly and time consuming proceeding. As such, a need has developed in which to form a grout tube which includes the necessary structure so as to allow the grout tube to be properly affixed to the grout hole of the anchor plate.

It is an object of the present invention to provide a post-tensioning system which allows for the easy attachment of a grout tube to the anchor plate.

It is another object of the present invention to provide a post-tensioning system which eliminates the need for machining operations on the anchor plate casting.

It is another object of the present invention to provide a post-tensioning system which eliminates the need for forming and attaching fittings to the grout tube.

It is still another object of the present invention to provide a post-tensioning system which simplifies grouting procedures, reduces costs, and eliminates unnecessary equipment.

These and other objects and advantages of the present invention will become apparent from a reading of the attached specification and appended claims.

SUMMARY OF THE INVENTION

The present invention is a multi-strand anchorage system that comprises an anchor body having a tendon-receiving area therein and having a channel extending through a wall thereof, and a grout tube extending through the channel so as to have an outlet opening to the tendon-receiving area. The channel opens at an exterior of the anchor body and communicates with the tendon-receiving area. The grout tube has a pronged exterior surface adjacent to the outlet of the grout tube. This pronged exterior surface is in abutment with a surface of the anchor body. The grout tube serves to pass grout to the tendon-receiving area.

The channel has a first passage opening to the exterior surface and a second passage communicating with the tendon-receiving area. The first passage is coaxial with the second passage so as to form a straight channel. The second passage has a smaller diameter than the first passage. The channel has a shoulder defined at the juncture of the first passage with the second passage.

The grout tube has a shoulder formed a distance from the outlet. The shoulder has a diameter less than the diameter of the first passage and greater than the diameter of the second passage. This distance is generally equal to a length of the second passage. The grout tube has a seal connected thereto. The seal serves to form a liquid-tight seal between an exterior of the grout tube and an interior of the channel. This seal is an annular elastomeric seal affixed around the grout tube in abutment with the shoulder of the grout tube. The annular seal is in compressive abutment with the shoulder of the channel.

The pronged exterior surface includes a plurality of prong members extending outwardly of an exterior surface of the grout tube. This plurality of prong members specifically includes four prong members each being equally spaced from an adjacent prong member around a diameter of the grout tube. The pronged exterior surface tapers outwardly from the grout tube such that the pronged exterior surface has a narrow diameter adjacent to the outlet and a wider diameter away from the outlet.

The present invention is also an improved grout tube for such a multi-strand post-tension system. The present invention is furthermore an improved anchor plate for such a multi-strand anchorage system.

DETAILED DESCRIPTION OF THE INVENTION

Figure 1:
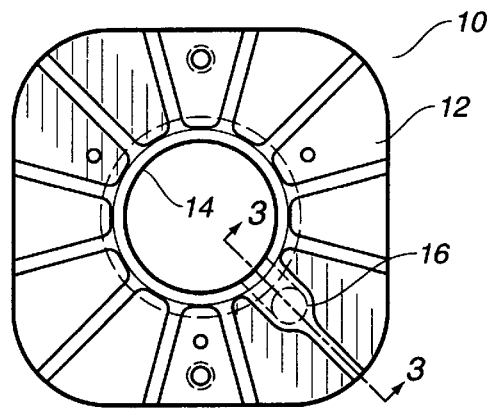
FIG. 1 is an end view of an anchor of a prior art multi-strand anchorage system.
Figure 2:
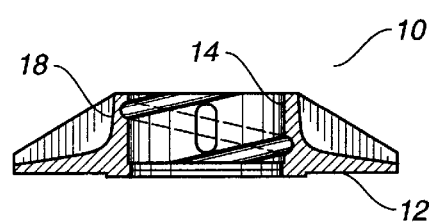
FIG. 2 is a side view of the anchor of the prior art multi-strand anchorage system.
Figure 3:
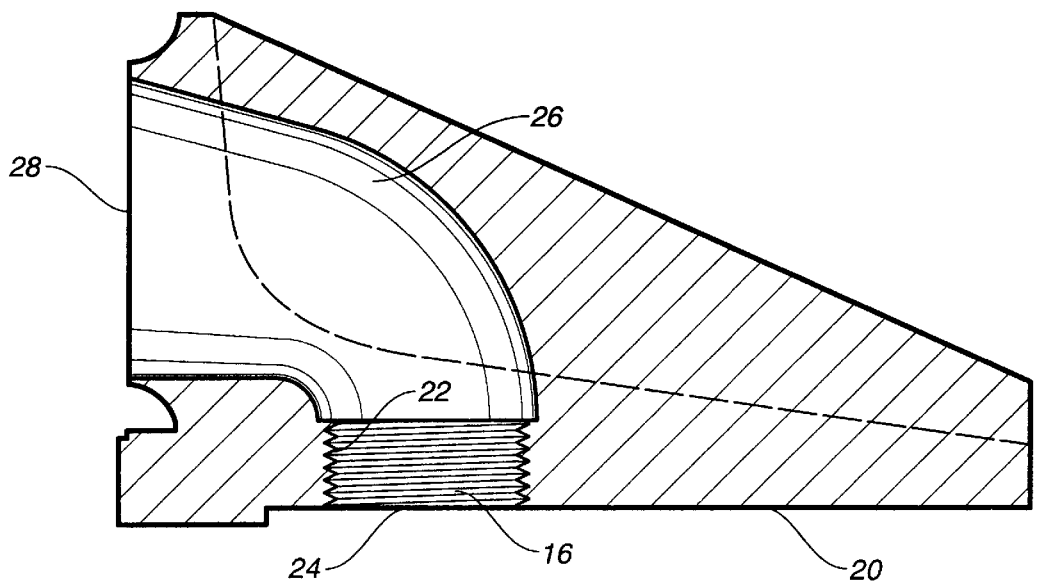
FIG. 3 is a detailed and enlarged view taken across lines 3—3 of FIG. 1 of the anchor and grout tube connection of the prior art multi-strand anchorage system.
Figure 4:
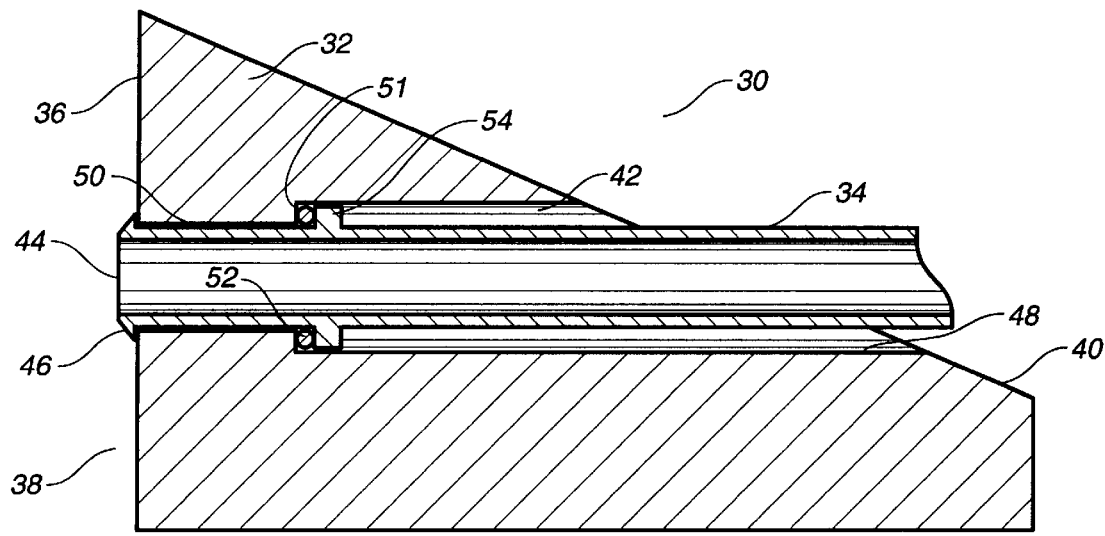
FIG. 4 is a cross-sectional view of the anchor plate and grout tube in accordance with the present invention.

Referring to FIG. 4, there is shown at 30 the improved anchor plate/grout tube arrangement as used in the post-tension system of the present invention. Initially, it can be seen that the system 30 includes anchor plate 32 and grout tube 34. As described herein, the anchor plate 32 can be one of a large number of forms of anchor plate. The anchor plate 32 can be considered to have a similar exterior form as that of FIGS. 1–3. The present invention has a refined orientation of the grout hole of the anchor plate and also an improved grout tube 34 for receipt within such grout hole.

Initially, it can be seen that the anchor plate 32 is a steel anchor plate having a surface 36 adjacent to the tendon-receiving area 38. In conventional practice, multiple tendons will extend into area 38. Area 38 can resemble the area 14 of FIG. 1. Surface 40 is the exterior of the anchor plate 32. A channel 42 extends through the anchor plate 32. The channel 42 opens at the exterior 40 of the anchor body and communicates with the tendon-receiving area 38. Specifically, the channel 42 will open on the surface 36 adjacent to the tendon-receiving area 38.

The grout tube 34 is a plastic or elastomeric grout tube which extends through the channel 42 so as to have an outlet 44 opening to the tendon-receiving area 38. The grout tube 34 has a pronged exterior surface 46 adjacent to the outlet 44. This pronged exterior surface is in abutment with the surface 36 of the anchor body 32 adjacent to the tendon-receiving area 38. The grout tube 34 serves to pass grout to the tendon-receiving area 38.

The channel 42 has a first passage 48 which opens to the exterior surface 40 of the anchor body 32. A second passage 50 communicates with the tendon-receiving area 38 and opens to the surface 36 of the anchor body 32. The first passage 48 is coaxial with the second passage 50. As can be seen, the passages 48 and 50 form a straight channel through the anchor body 32. It can be seen that the second passage 50 has a smaller diameter than the first passage 48. A shoulder 51 is formed at the juncture of the first passage 48 with the second passage 50.

It can be seen in FIG. 4 that the grout tube 34 has a shoulder 54 formed a distance away from the outlet 44. The shoulder 54 has a diameter which is less than the diameter of the first passage 48. The shoulder 54 has a diameter which is greater than the diameter of the second passage 50. In general, the distance between the shoulder 54 and the pronged exterior surface 46 will be equal to the length of the second passage 50. An elastomeric seal 52 is affixed to the grout tube 34 so as to form a liquid-tight seal between the exterior of the grout tube 34 and the interior of the channel 42. Specifically, the seal 52 is an O-ring seal which is placed around the exterior surface of the grout tube 34 so as to be adjacent to the shoulder 54. As can be seen in FIG. 4, the seal 52 is in compressive abutment between the shoulder 51 of the channel 42 and the shoulder 54 of the grout tube 34. The pronged exterior surface 46 serves to retain the seal 52 in such compressive contact.

In the installation of the grout tube 34 within the channel 42, it is only necessary to insert the pronged exterior surface 46 through the first passage 48 and through the second passage 50. The pronged exterior surface 46 has a specific configuration which allows for the passage of such pronged exterior surface 46 through the smaller diameter second passage 50. When the pronged exterior surface 46 passes through the opening to the surface 36, the pronged exterior surface 46 will rest in compressive contact with the surface 46. When this has been accomplished, the shoulder 54 of the grout tube 34 will exert compressive pressure upon the O-ring seal 52 so as to be properly retained within the channel 42. Because of the proper sizing of the grout tube 34 and the proper consideration of length and material flexibility, the grout tube 34 can be easily installed within the channel 42 so as to have its outlet 44 exposed to the tendon-receiving area 38. The present invention eliminates the need for any threaded attachments, threaded fittings, machining operations, or other devices which have previously been used so as to accomplish such a fit.

Figure 5:
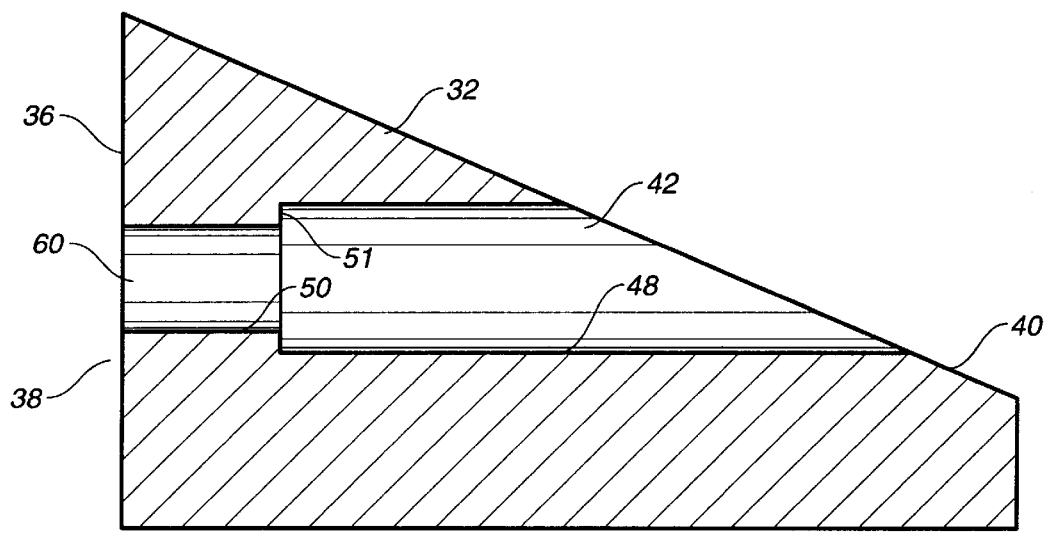
FIG. 5 is an isolated cross-sectional view of the anchor plate of the present invention.

FIG. 5 is an isolated view of the anchor body 32. It can be seen that the anchor body 32 has an exterior surface 40 and an interior surface 36 adjacent to the tendon-receiving area 38. The channel 42 is formed on the interior of the anchor body 32 by simple casting procedures. The channel 42 includes a first channel 48 and a second channel 50. It can be seen in FIG. 5 that the first passage 48 has a greater diameter than the second passage 50. Because of the configuration and function of the grout tube apparatus 34 of the present invention, it is not critical that proper sizing be carried out with respect to the diameter of the first passage 48 or the second passage 50 of the channel 42. The usage the shoulders, seals, prongs and exterior surface arrangements of the grout tube 34 eliminates the need for such precise tolerances. This configuration will eliminate the need for machining operations on the grout hole. It can be seen that the shoulder 51 is formed within the interior of the channel 42 between the first passage 48 and the second passage 50. It can further be seen that the second passage 50 has an opening 60 at the inner wall 38 of the anchor body 32.

Figure 6:
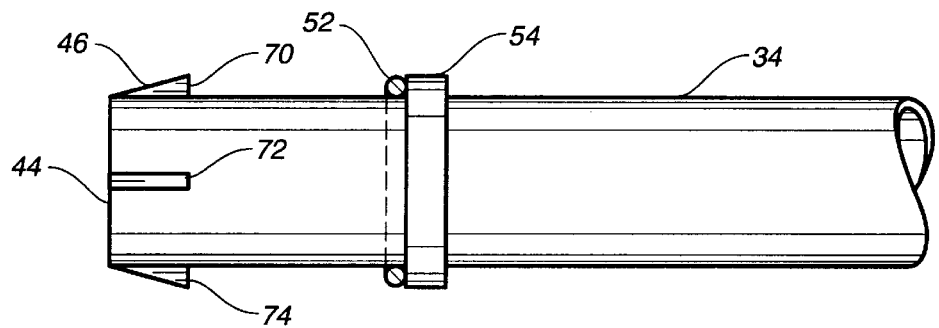
FIG. 6 is an isolated side elevational view of the grout tube accordance with the teachings of the present invention.

FIG. 6 shows the configuration of the grout tube 34. It can be seen that the grout tube 34 is a tubular member having an outlet 44 at one end. The grout tube 34 can be of any suitable length so as to extend from the grout pumping apparatus to the interior of the anchor body. The pronged exterior surface 46 is adjacent to the outlet 44 of the grout tube 34. The shoulder 54 is formed around the exterior surface of the grout tube 34. The elastomeric seal 52 is affixed adjacent to the surface of the shoulder 54 facing the pronged exterior surface 46. As stated previously, grout tube 34 can be formed of an elastomeric or polymeric material. There is no need for the use of any fittings on the outlet end 44 of the grout tube 34.

The pronged exterior surface 46 includes a plurality of prong members 70, 72, 74 and 76 (not shown) which extend outwardly of the exterior surface of the grout tube 34. Specifically, these four prong members 70, 72, 74 and 76 are each equally spaced from adjacent prong members and are also equally radially spaced from each other around the diameter of the grout tube. It can be seen that each of the prong members 70, 72, 74 and 76 tapers outwardly of the grout tube 34 such that the narrow diameter is adjacent to the outlet end 44 and the wider diameter of the pronged exterior surface is away from this outlet 44. The back surface of each of the prong members 70, 72, 74 and 76 will abut the inner wall 36 adjacent to the tendon-receiving area 38.

Figure 7:
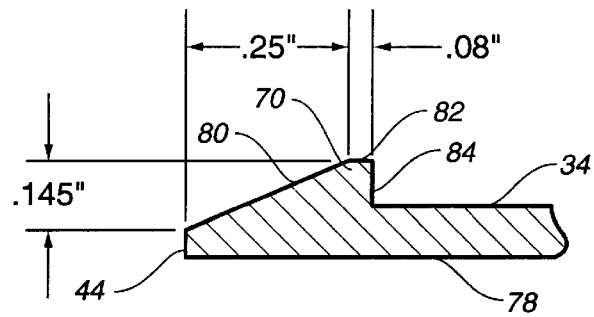
FIG. 7 is a large detailed view of a prong as used on the grout tube of the present invention.

FIG. 7 is a detailed view of a prong member 70. In the preferred embodiment of the present invention, the sizing and spacing of the various components of this prong member 70 are helpful to the proper functioning of the prong member 70. Each of the other prong members 72, 74 and 76 will have a similar configuration as prong member 70. Initially, the prong member 70 is adjacent to the outlet end 44 of the grout tube 34. Inner surface 78 is formed within the interior of the grout tube 34. The prong member 70 has a tapered portion 80 which extends upwardly and outwardly from the outlet end 44. The height of this tapered portion 80 is 0.145 inch. The length of this tapered portion is approximately ¼ inch. A flat portion 82 extends from the end of the tapered portion 80. This flat portion has a length of 0.08 inch. Finally, an abutment surface 84 extends downwardly from the end of the flat portion 82 to the exterior surface of the grout tube 34. It has been found that this configuration and dimensioning of the prong member 70 allows the prong member to properly pass through the channel and to reside in proper abutment with the surface 36 adjacent to the tendon-receiving area 38.

Figure 8:
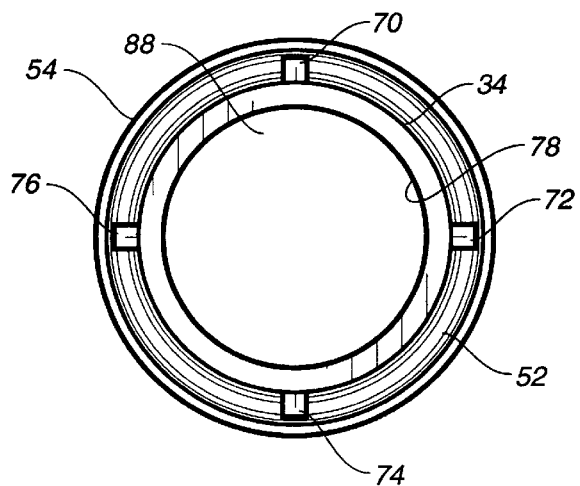
FIG. 8 is an end view of the outlet of the grout tube of the present invention.

FIG. 8 is an end view of the grout tube 34. It can be seen that the grout tube 34 has inner wall 78 formed thereon. The interior 88 of the grout tube 34 allows for the passage of grout into the tendon-receiving area of the anchor body. Prong members 70, 72, 74 and 76 extend radially outwardly from the exterior surface of the grout tube 34. The shoulder 54 and associated elastomeric seal 52 extend outwardly of the grout tube 34.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A multi-strand anchorage system comprising:
   an anchor body having a tendon-receiving area therein, said anchor body having a channel extending through a wall thereof, said channel extending transverse to said tendon-receiving area, said channel opening at an exterior of said anchor body, said channel communicating with said tendon-receiving area, said anchor body being of a steel material; and
   a grout tube means extending through said channel so as to have an outlet opening toward said tendon-receiving area, said grout tube means having a pronged exterior surface adjacent said outlet of said grout tube means, said pronged exterior surface in abutment with a surface of said anchor body, said grout tube means for passing grout to said tendon-receiving area.

2. The system of claim 1, said channel having a first passage opening to said exterior surface, said channel having a second passage communicating with said tendon-receiving area.

3. The system of claim 2, said first passage being coaxial with said second passage so as to form a straight channel.

4. The system of claim 3, said second passage having a smaller diameter than said first passage, said channel having a shoulder defined at a juncture of said first passage with said second passage.

5. The system of claim 4, said grout tube means having a shoulder formed a distance from said outlet, said shoulder having a diameter less than said diameter of said first passage and greater than said diameter of said second passage.

6. The system of claim 5, said distance being generally equal to a length of said second passage.

7. The system of claim 1, said grout tube means having a seal means connected thereto, said seal means for forming a liquid-tight seal between an exterior of said grout tube means and a surface in said channel.

8. The system of claim 5, said grout tube means having an annular seal affixed around said grout tube means in abutment with said shoulder of said grout tube means, said annular seal being in compressive abutment with said shoulder of said channel.

9. The system of claim 7, said seal means being an annular seal affixed around said grout tube means in compressive abutment with an interior surface of said channel.

10. The system of claim 1, said pronged exterior surface comprising a plurality of prong members extending outwardly of an exterior surface of said grout tube means.

11. The system of claim 10, said plurality of prong members comprising four prong members each being equally spaced from each other around the diameter of said grout tube means.

12. The system of claim 1, said pronged exterior surface tapering outwardly from said grout tube means such that said pronged exterior surface has a narrow diameter adjacent said outlet and a wider diameter said outlet.

13. An apparatus for a multi-strand anchorage system comprising:

an anchor body having a tendon-receiving area therein, said anchor body having a channel extending through a wall thereof, said channel extending transverse to said tendon-receiving area, said channel opening at an exterior surface of said anchor body and communicating with said tendon-receiving area, said channel having a first passage opening to said exterior surface, said channel having a second passage communicating with said tendon-receiving area, said second passage having a smaller diameter than said first passage, said channel having a shoulder defined at a juncture of said first passage, said first passage being coaxial with said second passage, said channel extending straight through said anchor body.

14. The anchor body of claim 13, said first passage being coaxial with said second passage.

15. The anchor body of claim 14, said first passage and said second passage forming a straight channel through said anchor body.

* * * * *